C. WOLLERSEN.
DUMP CART.
APPLICATION FILED AUG. 25, 1915.
1,186,359.
Patented June 6, 1916.
2 SHEETS—SHEET 1.
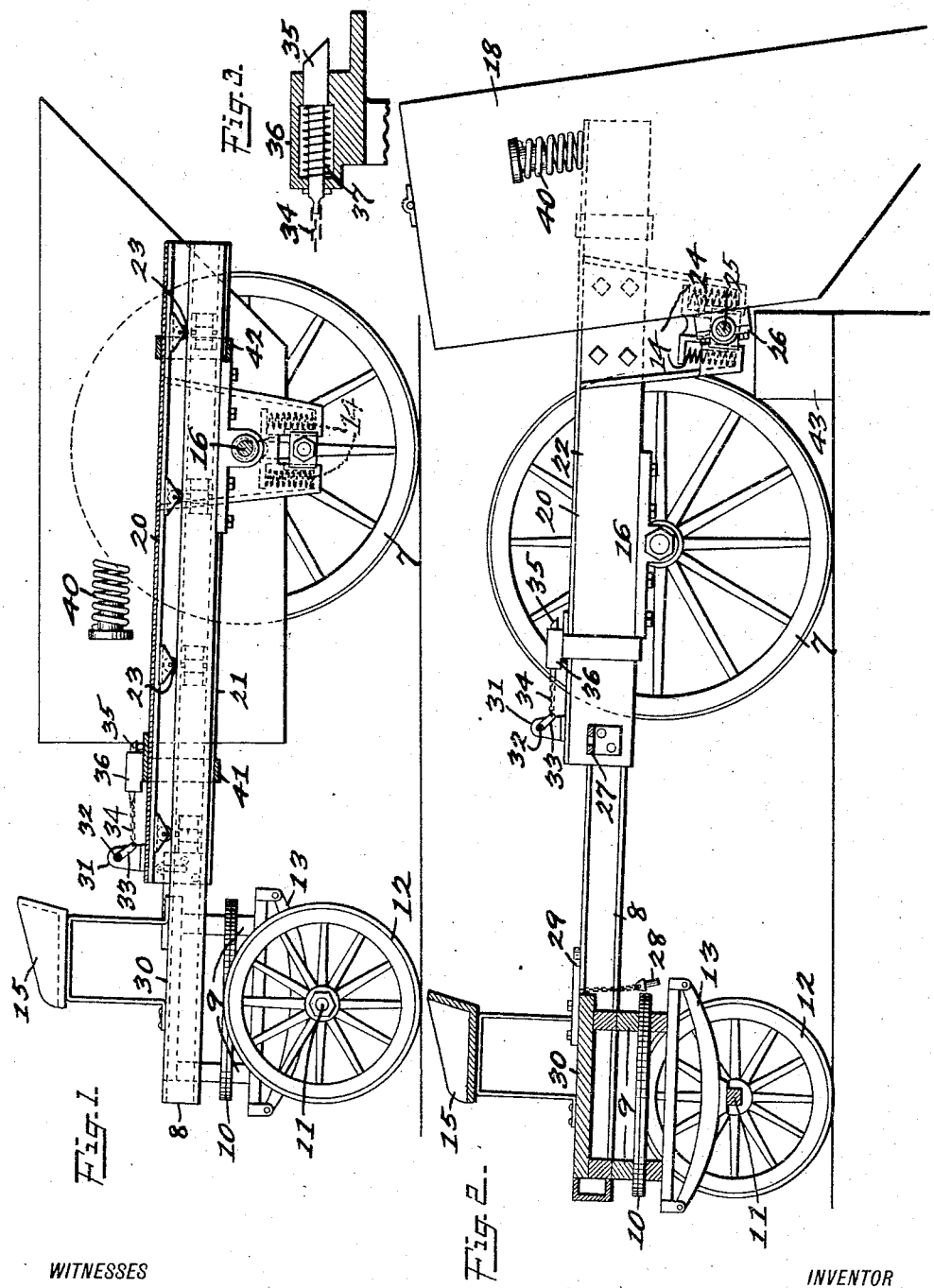
WITNESSES
George L. Blume.
J. C. Larsen
INVENTOR
Christian Wollersen
BY
ATTORNEYS

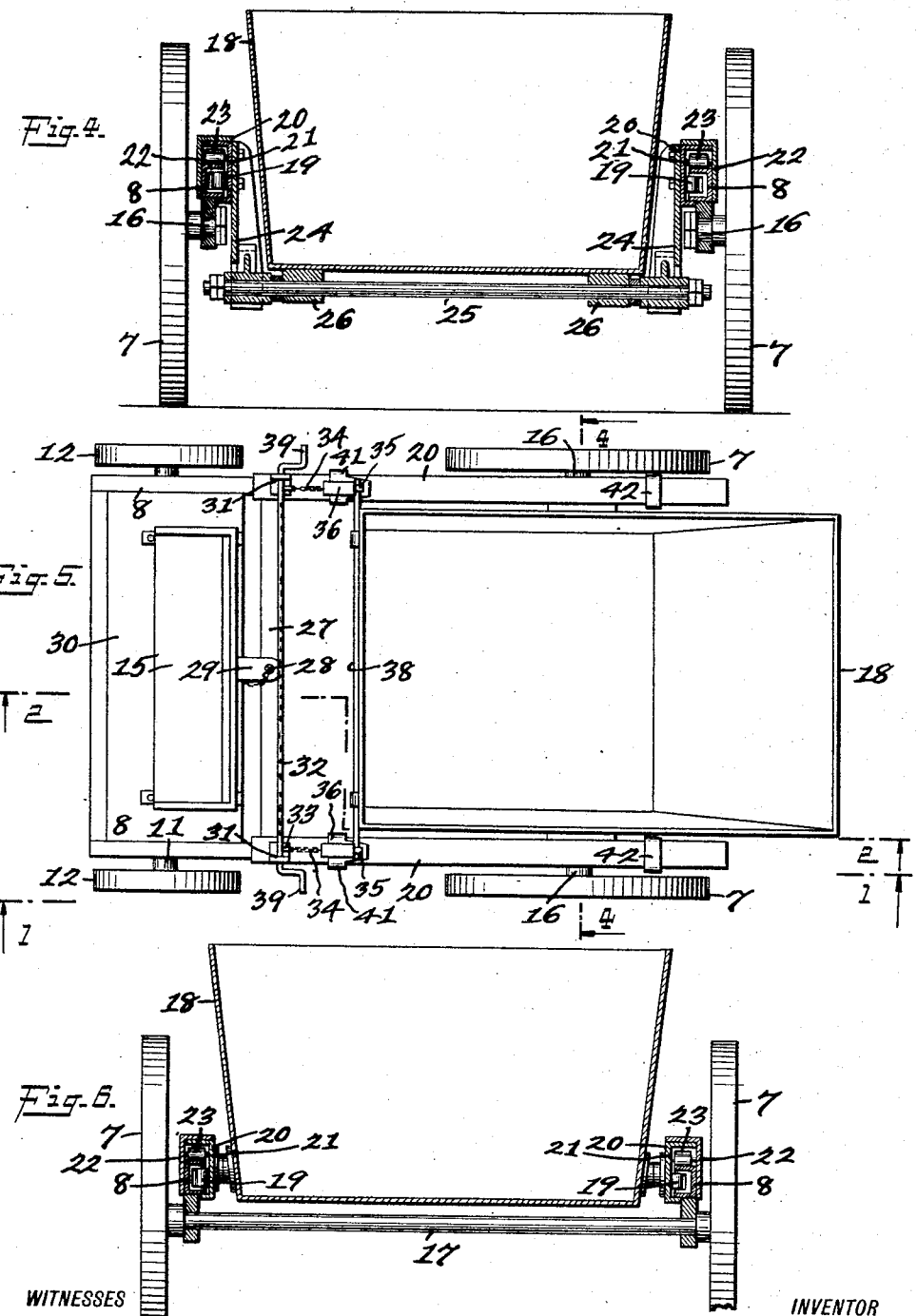

UNITED STATES PATENT OFFICE.

CHRISTIAN WOLLERSEN, OF NEW YORK, N. Y.

DUMP-CART.

1,186,359.  Specification of Letters Patent.  Patented June 6, 1916.

Application filed August 25, 1915. Serial No. 47,221.

*To all whom it may concern:*

Be it known that I, CHRISTIAN WOLLERSEN, a citizen of the United States, and a resident of New York, in the county and State of New York, have invented certain new and useful Improvements in Dump-Carts, of which the following is a specification.

My invention relates to dump carts, and the main object thereof is to provide a cart of this type which is more easily loaded than those now known to me, which is quickly and easily unloaded in a practically automatic manner when desired, which provides a substantially telescopic connection between the wagon frame and the load carrying body practically immune from the entrance of extraneous matter, and which, in my preferred form, is especially adapted for dumping from a dock to a scow the deck of which is at a lower level than the dock.

My invention is fully described in the following specification, of which the accompanying drawings form a part, in which like characters refer to like parts in each of the views, and in which:—

Figure 1 is a vertical section taken on the line 1—1 of Fig. 5; Fig. 2 is a similar section taken on the line 2—2 of Fig. 5; Fig. 3 is a sectional, fragmentary, view of a detail comprising a latch which I employ; Fig. 4 is a vertical section taken on the line 4—4 of Fig. 5; Fig. 5 is a top plan view of the cart shown in the preceding figures; and Fig. 6 is a view similar to Fig. 4, but showing a modification thereover.

In the drawings forming part of this application I have shown a vehicle comprising rear wheels 7 supporting a frame formed by side bars 8 the forward ends of which rest upon the transverse bars 9 which in turn are supported by the "fifth-wheel" 10 carried by the front axle 11 provided with wheels 12, suitable springs 13 being provided for the forward end of the vehicle and springs 14 for the rear end thereof, a suitable seat 15 being also provided.

In the form shown in Figs. 1 to 5, inclusive, the rear ends of the side bars 8 are provided with stub-axles 16 for the rear wheels 7, thereby dispensing with a rear axle and making a low-hung body possible, these stub-shafts or axles being carried in suitable supports secured to the respective rear springs 14, as is clearly illustrated in Figs. 1, 2, and 4. I may, however, provide the rear axle 17 shown in Fig. 6, although this raises the body 18 higher than in the form shown in the preceding figures, the two forms being adapted for different uses as will be later explained.

In the form shown, the side bars are formed of channel bars provided with anti-friction rollers 19 at the inner open sides thereof, said side bars being downwardly inclined from front to rear and serve as tracks for a carriage formed of side members 20 consisting, each, of a channel bar 21 having its open side outwardly directed and embracing the respective side bar 8, and an angle bar 22 depending over the outer face of the respective side bar 8, said side members being provided with anti-friction rollers 23 bearing on the top of the respective side bar 8; the channel bars 21 bear against the respective rollers 19 and it will thus be seen that both lateral and longitudinal carriage movement is taken in an anti-frictional manner.

In the form shown in Figs. 1 to 5, inclusive, I provide a hanger 24 for each of the side members 20, which hangers are arranged opposite to each other, nearer the rear of the carriage than to the front, and serve as supports for a shaft 25 which carries bearings 26 secured to the under side of the body 18, somewhat to the rear of the central, vertical, transverse, plane of the body in order that the body will be maintained in normal position by gravity, when loaded or unloaded, while being loaded or while being drawn.

The side members 20 of the carriage support a platform or bar 27 perforated centrally of the carriage for the reception of a pin 28 which is also adapted to be passed through a correspondingly placed lug 29 on the platform 30 of the frame of the vehicle, this pin 28, when engaged with said bar 27 and lug 29, serving to lock the carriage securely in its forward position, this being the normal position thereof when loading and while being drawn.

The side members 20 carry, each, a support 31 for a shaft 32 provided with arms 33 having chains 34 connected therewith in turn connected to the respective ones of two latches 35 slidable in casing 36 and normally held toward the body 18 by springs 37, Fig. 3, said body 18 being provided with a transverse rod 38 on the lower forward end which is adapted to be engaged beneath both latches to prevent tilting of the body 18, and said shaft 32 is provided with a crank handle 39 at the ends thereof whereby it may be rotated to retract the latches to release the rod 38 and thus permit the body to be tilted. The rod 38 also serves to limit downward movement of the forward end of the body by striking against the upper surfaces of the side members 20, and I provide spring buffers 40 on the sides of the body 18 which are adapted to strike upon the outer ends of the side members 20 and thus limit the downward movement of the rear end of the body, yieldingly or resiliently. I also provide a stop 41 which is adapted to strike against the forward supports for the rear springs 14 to limit outward carriage movement, and a similar stop 42 limits inward carriage movement by striking against the rear supports of said springs.

Assuming the cart to be loaded and it is desired to dump the same, as into a scow alongside a pier, the cart is backed against a string-piece 43 on a pier or dock, the pin 28 removed from the lug 27 and plate 29, and the carriage starts down the incline of the side bars 8 until the stop 41 prevents further carriage movement; the shaft 32 may now be rotated to release the latches 35 from the rod 38 and the body tilted backwardly to dump its load, this operation being instantaneous and requiring no effort on the part of the driver other than the effort required to return the body to normal position, in its empty state.

In view of the low-hung body comparatively little lift is required for loading the cart, and this is of considerable advantage when the cart is used for garbage or ash removal and barrels or cans must be dumped into the body, and also when the cart is being filled by shoveling from an excavation in the ground, and also for snow removal in weather which causes the snow to adhere to the shovels. The form shown in Fig. 6 does not possess these last named advantages, but it does possess the advantage of the inclined runways for the carriage, and the anti-friction rollers which render dumping easy, this cart being better adapted for dumping on levels of the cart support, whereas the first form is better adapted for dumping to lower levels than that of the cart support, as at the string-pieces of docks to scows, the decks of which are usually at a lower level than that of the dock.

My invention is highly efficient, and I reserve the right to make such changes over the form shown as properly come within the spirit of the invention and the scope of the following claims.

Having fully described my invention, what I claim as new, and desire to secure by Letters Patent, is:—

1. A dump-cart comprising a frame, wheels thereunder, a carriage slidable on said frame, anti-frictional rollers interposed between said carriage and frame, means for holding said carriage in normal position, hangers depending from said carriage, and a body in pivotal connection with said hangers, said frame being rearwardly and downwardly inclined.

2. A dump-cart, comprising a frame, wheels thereunder, a carriage slidable on said frame, anti-frictional rollers interposed between said carriage and frame, means for holding said carriage in normal position, a body in pivotal connection with said carriage, means for holding said body in normal position, and means for resiliently limiting the tilting movement of said body, said frame being rearwardly and downwardly inclined.

3. A dump-cart, comprising a frame, wheels thereunder, a carriage slidable on said frame, anti-frictional rollers interposed between said carriage and frame, means for holding said carriage in normal position, a body, means for pivotally supporting the same beneath the centers of the rear wheels, and means for holding said body in normal position, said frame being rearwardly and downwardly inclined.

4. A dump-cart, comprising a frame formed of side bars, an outwardly directed stub-axle on each side bar, a wheel on each axle, wheels beneath the forward end of said frame, a carriage slidable on said frame, anti-frictional rollers interposed between said carriage and frame, means for holding said carriage in normal position, a hanger dependent from each side of said carriage, a shaft carried by said hangers, a body pivotally supported on said shaft, and means for holding said body in normal position, said frame being rearwardly and downwardly inclined.

5. A dump cart, comprising a frame including side bars formed of inwardly opening channel bars, a carriage slidable on said frame including outwardly opening channel bars embracing said first named bars, rollers interposed between said frame and carriage bars, an angle bar depending from each of said carriage bars over the outer surface of the respective frame bar, means for holding said carriage in position, and a body pivoted on said carriage.

6. A dump cart, comprising a frame including side bars formed of inwardly opening channel bars, a carriage slidable on said frame including outwardly opening channel bars embracing said first named bars, rollers interposed between said frame and carriage for supporting the latter, rollers interposed between said frame and carriage for alining the latter, an angle bar depending from each carriage bar over the outer surface of said frame bar, means for holding said carriage in position, and a body pivoted on said carriage.

In testimony whereof I have signed my name to this specification in the presence of two witnesses.

CHRISTIAN WOLLERSEN.

Witnesses:
J. C. LARSEN,
G. H. EMSLIE.

Copies of this patent may be obtained for five cents each, by addressing the "Commissioner of Patents, Washington, D. C."